(12) United States Patent
Kidman

(10) Patent No.: US 7,789,605 B2
(45) Date of Patent: Sep. 7, 2010

(54) SLIDE LOCK FASTENER

(75) Inventor: Beau Kidman, Kalamazoo, MI (US)

(73) Assignee: Mann + Hummel GmbH, Ludwigsburg (DE)

( * ) Notice: Subject to any disclaimer, the term of this patent is extended or adjusted under 35 U.S.C. 154(b) by 575 days.

(21) Appl. No.: 11/802,747

(22) Filed: May 24, 2007

(65) Prior Publication Data

US 2007/0274801 A1   Nov. 29, 2007

Related U.S. Application Data

(60) Provisional application No. 60/808,114, filed on May 25, 2006.

(51) Int. Cl.
*F16B 13/06* (2006.01)
(52) U.S. Cl. ............................................. 411/34
(58) Field of Classification Search ............. 411/34–38; 215/359
See application file for complete search history.

(56) References Cited

U.S. PATENT DOCUMENTS

| 469,095 | A | * | 2/1892 | Hall | 215/359 |
|---|---|---|---|---|---|
| 907,145 | A | * | 12/1908 | Schmidt | 215/280 |
| 1,469,487 | A | * | 10/1923 | Schedler | 215/359 |
| 2,688,894 | A | * | 9/1954 | Modrey | 411/34 |
| 2,822,103 | A | * | 2/1958 | Moeller | 215/359 |
| 3,093,220 | A | * | 6/1963 | Modrey | 403/408.1 |
| 3,343,442 | A | * | 9/1967 | Knowlton et al. | 411/34 |
| 3,534,936 | A | * | 10/1970 | Knowlton | 248/653 |
| 4,436,467 | A | * | 3/1984 | Larsson et al. | 411/34 |
| 6,868,590 | B2 | * | 3/2005 | Bentrim | 24/458 |
| 7,052,221 | B2 | * | 5/2006 | Bentrim | 411/34 |

* cited by examiner

*Primary Examiner*—Flemming Saether

(57) ABSTRACT

A slide lock fastener assembly for removeably fastening a first part to a second part, in which the fastening and unfastening operations include a sliding operation, the fastener assembly having a locking pin, a cylindrical isolation sleeve, and a slider member. A fastened condition is created between the two parts by inserting the slider member between a surface of the first part and a locking pin head of the locking pin. The insertion causes a deformation of a wall portion of the isolation sleeve such that a portion of the wall engages a surface of the second part.

11 Claims, 2 Drawing Sheets

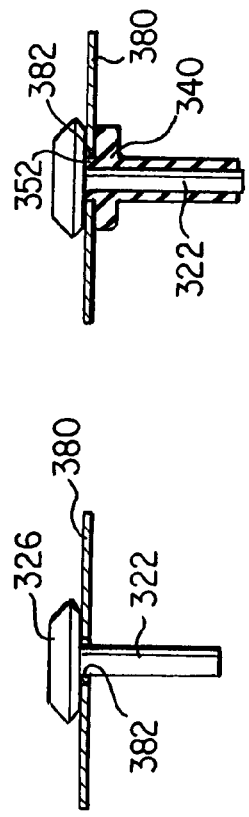
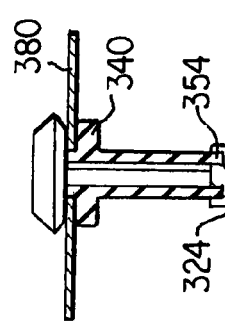
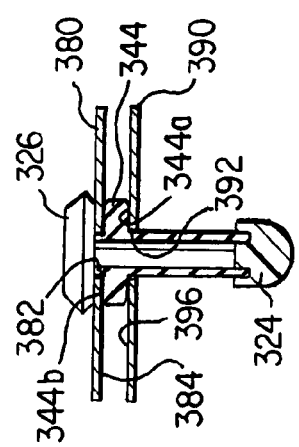
FIG. 4a    FIG. 4b    FIG. 4c    FIG. 4d
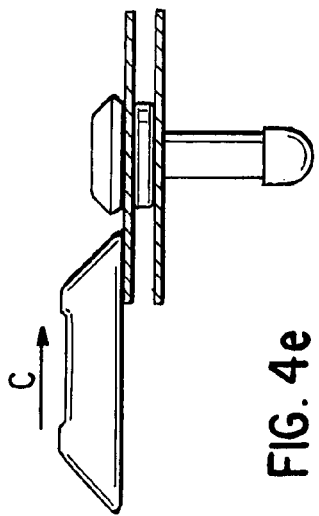
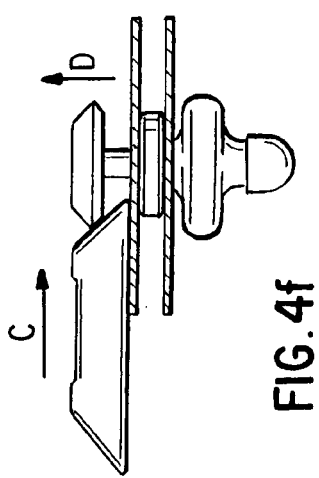
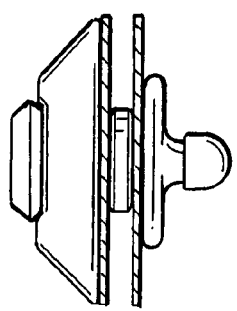
FIG. 4e    FIG. 4f    FIG. 4g
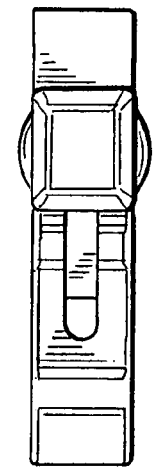
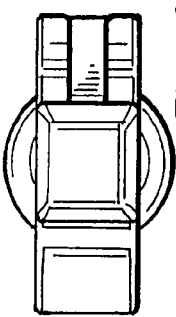
FIG. 4h    FIG. 4i    FIG. 4j

SLIDE LOCK FASTENER

BACKGROUND OF THE INVENTION

This invention relates to a releasable fastener. The fastener of the invention is particularly useful to mount components to a plate member such as a piece of sheet metal in the engine compartment of a motor vehicle.

Conventional fasteners for attaching a component to a plate member are shown in FIGS. 1 and 2. In FIG. 1, fastener 100 includes a pin 110 and an isolation grommet 120 that cooperate to fasten component 140 to plate member 150. Pin 110 is fixedly mounted to the plate member 150 via a threaded hole formed in the plate member. The pin includes a pin main body 111 having a protruding flange 112 at a head portion 113 thereof. Grommet 120, which is inserted into a mounting aperture 144 formed in a wall of the component 140, includes cylinder member 122 having an exterior flange 124 for engaging a surface 142 of the component, and an interior peripheral surface 126 for engaging the flange 112 of the pin. The head of the pin 110 is inserted into the grommet 120 whereby the protruding portion of flange 112 engages the peripheral surface 126 of the grommet resulting in an attached condition between the component and the plate member. As shown in FIG. 1, the pin is mounted to the plate member, and the grommet is inserted in a mounting aperture formed in the component. An alternate configuration, where the pin and grommet positions are reversed, is shown in FIG. 2.

Referring to FIG. 2, fastener 200 includes pin 210 and isolation grommet 220. Pin 210 is formed as an integral part of component 240 (e.g. by injection molding) and includes a pin main body 211 having a flange 212 at a head portion thereof. By first inserting the grommet 220 into a mounting aperture 244 formed in a wall of the plate member, and subsequently inserting the head of the pin into the grommet 220, an attached condition between the component and the plate member is realized when a protruding portion of flange 212 engages a peripheral surface 226 formed on an inner surface of the grommet. Components 140, 240 can be various parts such as an air filter housing or an intake pipe, which are adapted to be mounted in the engine compartment of a motor vehicle.

With each of the prior art fasteners shown in FIGS. 1 and 2, prior to inserting the pin into the grommet, the method of using the fasteners includes the additional assembly step of inserting an isolator grommet into a aperture formed in one of the parts. Furthermore, once a pin is inserted into the receiving portion of a grommet, the pin is not readily removable without likely causing damage to the fastener (e.g., damaging the grommet). Finally, the fastener illustrated in FIG. 1 involves the added step and the added expense of forming a threaded hole in the plate member in order to fixedly mount the pin thereto.

Accordingly, it would be advantageous to provide a fastener comprising an integrated isolator grommet such that the added step of inserting an isolator grommet into an aperture in one of the parts can be eliminated. It would also be advantageous to provide a fastener that obviates the need to form threaded holes and that can be easily unfastened so that attached parts can be easily unattached.

SUMMARY OF THE INVENTION

It is a primary object of the invention to provide a fastener comprising an integrated isolator grommet and a sliding locking mechanism.

Another object of the invention is to provide a fastener that is easily fastened and unfastened.

A further object of the invention is to provide a fastener especially adapted for securely mounting a component in the engine compartment of a motor vehicle.

The slide lock fastener of the invention comprises a locking pin, a cylindrical isolation sleeve, and a slider member. The locking pin includes an elongated shaft with a retaining member at a first end and a pin head at a second end.

The isolation sleeve comprises a deformable sleeve wall adjacent to a first end, and a radially-extending isolation ring formed adjacent to a second end. The first end of the isolation sleeve is adapted to be retained by the retaining member. The sleeve further comprises an axial opening extending therethrough that is sized to receive the locking pin shaft.

The slider member comprises a slider main body having a top surface, a bottom surface, and an outwardly sloping sidewall surface extending from the top surface toward the bottom surface. The slider member further comprises a notch that is formed in the slider main body and extends from the top and sloping sidewall surfaces through the slider main body to the bottom surface. The notch is sized to receive the locking pin shaft.

The slide lock fastener for mounting components, particularly an air filter housing or an intake pipe, is advantageously further developed according to the invention in that it is readily fastened and unfastened. In the fastened state, the slider member is inserted between the head of the locking pin and one surface of a first part to be fastened. By sliding the slider member between the head of the locking pin and a part to be fastened, the locking pin is displaced in an axial direction such that the sleeve wall deforms and engages a surface of a second part to be fastened. Thus, pressure is exerted on opposite sides of the first and second parts thereby creating an attached condition between the parts. According to one embodiment, the head of the locking pin rests in a recessed region formed in the top surface of the slider member, thereby maintaining the slide lock fastener in the fastened state.

A method of fastening two parts using the removable fastener assembly comprises (i) inserting the shaft of the locking pin through a first aperture formed in a first part to be fastened (ii) inserting the second end of the cylindrical isolation sleeve over the shaft such that an axial surface of the isolation ring contacts a surface of the first part to form an integrated isolation sleeve (iii) attaching a retaining member to the distal end of the shaft to secure the isolation sleeve on the shaft (iv) inserting the integrated isolation sleeve through a second aperture in a second part to be fastened, and (v) inserting the slider member between the locking pin head and a surface of the first part so as to displace the pin in an axial direction by an amount effective to deform the deformable sleeve wall such that a portion of the sleeve wall engages a surface of the second part. A method of unfastening the parts involves reversing steps (i)-(v).

These and other features of preferred embodiments of the invention, in addition to being set forth in the claims, are also disclosed in the specification and/or in the drawings, and the individual features each may be implemented in embodiments of the invention either individually or in the form of sub-combinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which:

FIGS. 4a to 4j depict an assembly process for a slide lock fastener according to one embodiment.

DETAILED DESCRIPTION OF PREFERRED EMBODIMENTS

Figure 1:
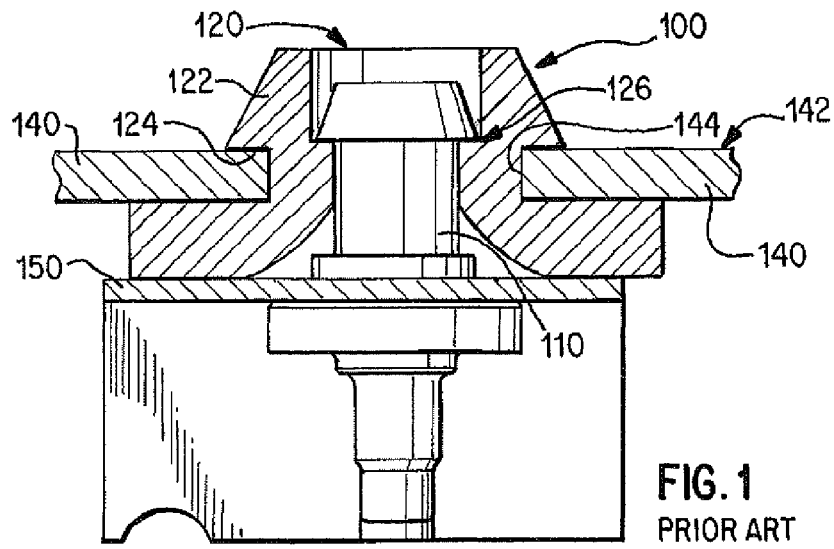
FIG. 1 shows a prior art fastener having an isolation grommet inserted in an aperture formed in a wall of an automobile component.
Figure 2:
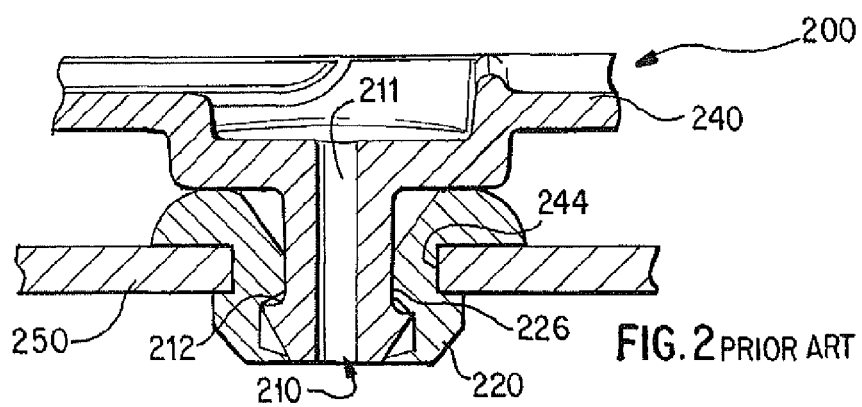
FIG. 2 shows a prior art fastener having an isolation grommet inserted in an aperture formed in a wall of a sheet metal plate member.
Figure 3:
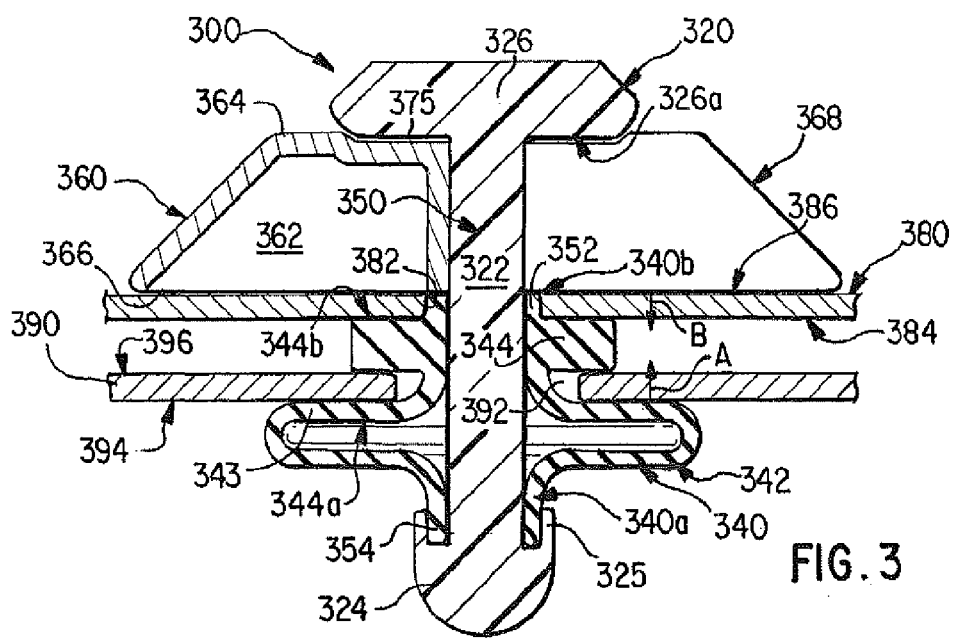
FIG. 3 shows an assembled slide lock fastener according to one embodiment of the present invention.

A cross sectional illustration of an assembled slide lock fastener according to one embodiment is shown in FIG. 3. The slide lock fastener 300 includes a locking pin 320, a cylindrical isolation sleeve 340, and a slider member 360, which cooperate to fasten together two or more components. Such components include an air filter housing, an intake pipe, and a fixed frame member. For example, shown in FIG. 3 are wall sections 380 and 390 of an air filter housing and a fixed frame member, respectively.

The locking pin 320 includes an elongated shaft portion 322 having a pin head 326 at one end of the shaft and, in its assembled state, a retaining member 324 attached at the opposite end. The retaining member 324, which can be attached to the shaft portion via a snap-on connection, a screw-on connection, or using some other suitable connection, comprises a retaining shoulder 325. As described in additional detail below, the retaining shoulder is adapted to retain one end 354 of the isolation sleeve 340.

The shaft portion 322 and the pin head 326 of the locking pin 320 preferably comprise a unitary part formed from, for example, a synthetic resin material such as nylon or polypropylene. The retaining member is also preferably formed from a synthetic resin material. However, the locking pin can be formed using other materials such as metals, alloys, or ceramics. Preferably, the shaft portion 322 has a smooth outer bore and comprises a substantially circular radial cross section, though other Euclidean cross sections are possible.

The isolation sleeve 340 comprises a deformable sleeve wall 342 adjacent to a first end 340a of the isolation sleeve, and a radially-extending isolation ring 344 formed adjacent to a second end 340b of the isolation sleeve. In FIG. 3, deformable sleeve wall 342 is shown in its deformed state. The first end 340a is adapted to be retained by the retaining member 324 and the second end 340b is adapted to be retained by an aperture 382 formed in one of the parts. Retaining member 324 inhibits displacement of the first end of the isolation sleeve with respect to the locking pin shaft.

The sleeve further comprises an axial opening 350 extending therethrough sized to receive the locking pin shaft 322. The isolation sleeve 340, which functions to isolate the locking pin from the two parts as well as isolation the parts from each other, is preferably formed from a resilient elastic material such as rubber (e.g., a synthetic or a natural rubber material) which can damp or inhibit vibrations of the mounted components.

The slider member 360 comprises a slider main body 362 having a top surface 364, a bottom surface 366, and an outwardly sloping sidewall surface 368 extending from the top surface toward the bottom surface. Referring to FIG. 4, which includes a top view of the slide lock fastener assembly, the slider member further comprises a notch 370 that is formed in the slider main body and extends from the top and sloping sidewall surfaces through the slider main body to the bottom surface. The notch is sized to receive the locking pin shaft.

According to an embodiment, the slider member can further include a second outwardly sloping sidewall surface extending from the top surface toward the bottom surface. The second sloping surface can be provided such that the slider member has a substantially symmetrical cross sectional shape. It is to be understood, however, that notch 370 passes through only one sloping sidewall surface such that the second sloping sidewall surface comprises a substantially contiguous surface.

The fastener assembly of the invention is particularly intended for use in removeably joining a first component to a second component. To be joined by the fastener assembly, each component is provided with an aperture. As shown, aperture 382 is formed in wall section 380, and aperture 392 is formed in wall section 390. Each aperture must be smaller in size than both the radially-extending isolation ring 344 and the locking pin head 326, but sufficiently large to accommodate passage therethrough of the shaft 322 of the locking pin.

In its inserted state, the slider member 360 holds the locking pin in a partially withdrawn state wherein the sleeve wall 342 is caused to be buckled (deformed in a radial direction with respect to the axis of the shaft of the locking pin) so that a portion of the sleeve wall 343 contacts a surface 394 of part 390 and exerts a force on the part 390 in the direction of the axis of the shaft of the locking pin. Likewise, bottom surface 366 of the slider member contacts a surface 386 of part 380 and exerts a force on the part 380 in the direction of the axis of the shaft of the locking pin. The force acting on the part 390 is represented schematically by Arrow A, and the force acting on the part 380 is represented schematically by Arrow B. Thus, part 380 and part 390 are fastened together between slider member 260 and the deformed portion of isolation sleeve 340 due to the opposing forces exerted on the parts.

Further aspects of the fastener assembly are described next in reference to FIGS. 4a to 4j, which illustrate a method of fastening two parts according to a preferred embodiment.

As a preliminary step in a fastening operation, the shaft 322 of the locking pin 320 is inserted through a first aperture 382 formed in a first part 380 to be fastened (FIG. 4a). The locking pin head 326 prevents the locking pin from passing completely through the aperture 382. The isolation sleeve 340 is then telescoped over a portion of the pin shaft 322 such that an axial surface 344b of the isolation ring 344 contacts a surface 384 of the first part (FIG. 4b). According to a preferred embodiment, an axial end portion 352 of the isolation sleeve fits in and is retained by aperture 382. Such retention helps secure the isolation sleeve between the two parts and ensure a stable attached condition.

The retaining member 324 is then attached to a distal end of the shaft 322 to secure the isolation sleeve 340 on the shaft (FIG. 4c). As shown, an axial end portion 354 of the isolation sleeve fits in and is retained by retaining shoulder 325. By securing the isolation sleeve on the shaft using the retaining member 324, when the locking pin is partially withdrawn through aligned apertures in the two parts, the axial displacement of the locking pin will cause a deformation in the wall of the isolation sleeve.

In a subsequent step, the shaft comprising the isolation sleeve is aligned with, and inserted through, a second aperture 392 formed in a second part 390 such that an axial surface 344a of the isolation ring 344 contacts a surface 396 of the second part 390 (FIG. 4d).

Finally, in order complete the assembly, the slider member 360 is inserted between the locking pin head 326 and a surface 386 of the first part so as to displace the pin 320 in an axial direction by an amount effective to deform said deformable sleeve wall 342 such that a portion of the sleeve wall 343 engages a surface 394 of the second part to created a fastened condition (FIGS. 4e-4f). The amount of the displacement of the pin is approximately equal to the height of the slider member, which can be measured as the distance between the top surface and the bottom surface of the slider member. The assembled fastener is shown in FIG. 4g. FIGS. 4h, 4i and 4j are top views of FIGS. 4e, 4f and 4g, respectively.

According to one advantageous embodiment, the fastened parts are not in direct contact with each other, but are separated from each other by isolation ring 344, which is slightly compressed between the two fastened parts. Thus, the isolation ring can dampen and thus minimize undesired vibration of the fastened parts.

As seen in FIGS. 4a-j, the slider member is inserted between locking pin head 326 and surface 386 by moving the slider member in a direction substantially co-planar with surface 386 (Arrow C). The resulting displacement of the locking pin, which rides up the wedge formed by the sloping sidewall surface, is perpendicular to the direction of motion of the slider member. The direction of the displacement of the locking pin during the fastening operation is shown by Arrow D. In the fastened condition, a bottom surface 326a of the locking pin head 326 engages the top surface 364 of the slider member.

According to another advantageous embodiment, the top surface of the slider main body further comprises a recessed region 375 adapted to receive the bottom surface of the locking pin head 326. The recessed region 375 provides a seat for the locking pin head, and thus inhibits the slider member from sliding out from between the locking pin head and surface 386.

When decoupling of the parts is desired, the decoupling requires that that slider member be removed from beneath the locking pin head. The locking pin can then be displaced axially by an amount effective to permit re-alignment of the deformed portion of the isolation sleeve with the outer bore of the shaft such that the shaft can be removed from the parts and the parts unfastened.

The overall dimensions of the locking pin, isolation member, and slider member are not particularly limited, and can be determined by routine experimentation. For example, the length of the locking pin shaft can be varied in order to accommodate the distance between opposing surfaces in two fastened parts, which is determined by, for example, the total wall thickness of the two parts and the thickness of the isolation member compressed therebetween.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations within the scope of the appended claims and equivalents thereof.

What is claimed is:

1. A removable fastener assembly comprising:
a locking pin having an elongated shaft that includes a retaining member attached at a first end of the elongated shaft and a pin head at a second end;
a cylindrical isolation sleeve having a buckleable sleeve wall adjacent to a first end thereof, and
a radially-extending isolation ring formed adjacent to a second end thereof, the sleeve comprising an opening therethrough sized to receive the shaft of the locking pin,
wherein the first end of the isolation sleeve is adapted to be retained by the retaining member; and
a slider member comprising
a slider main body having a top surface, a bottom surface, an outwardly sloping sidewall surface extending from said top surface toward said bottom surface, and
a notch extending from said top surface and said sloping sidewall surface through said slider main body to said bottom surface,
said notch sized to receive the shaft of the locking pin;
wherein the to surface of the slider main body comprises a recessed region adapted to receive a bottom surface of said locking pin head.

2. The fastener assembly of claim 1, wherein the retaining member is removeably attachable to the locking pin shaft.

3. The fastener assembly of claim 1, wherein the locking pin and the slider are made of a synthetic resin material and the isolation sleeve is made of resilient elastic material.

4. The fastener assembly of claim 1, wherein the second end of the isolation sleeve is adapted to be retained by an aperture formed in a part to be fastened by inserting said isolation sleeve at least partially through said aperture to buckle and engage against a surface of the part to be fastened.

5. The fastener assembly of claim 1, wherein the sleeve wall is adapted to deform and engage one side of a first part to be fastened.

6. The fastener assembly of claim 1, wherein the slider member is adapted to be inserted between the locking pin head and one side of a second part to be fastened.

7. A removable fastener assembly comprising:
a locking in having an elongated shaft that includes a retaining member attached at a first end of the elongated shaft and a pin head at a second end;
a cylindrical isolation sleeve having a buckleable sleeve wall adjacent to a first end thereof; and
a radially-extending isolation ring formed adjacent to a second end thereof, the sleeve comprising an opening therethrough sized to receive the shaft of the locking pin;
wherein the first end of the isolation sleeve is adapted to be retained by the retaining member; and
a slider member comprising
a slider main body having a top surface, a bottom surface, an outwardly sloping sidewall surface extending from said to surface toward said bottom surface; and
a notch extending from said to surface and said sloping sidewall surface through said slider main body to said bottom surface;
said notch sized to receive the shaft of the locking pin;
wherein the slider member further includes a second outwardly sloping sidewall surface extending from said top surface toward said bottom surface, said second sloping surface comprising a contiguous surface.

8. A method of fastening two parts using a removable fastener assembly, said fastener assembly comprising
a locking pin having an elongated shaft with a pin head formed opposite a distal end thereof,
a locking pin having an elongated shaft that includes a retaining member attachable at a first end of the elongated shaft and a pin head at a distal second end,
a cylindrical isolation sleeve having a buckleable sleeve wall adjacent to a first end thereof,
a radially-extending isolation ring formed adjacent to a second end thereof, the sleeve comprising an opening therethrough sized to receive the shaft of the locking pin, and
a slider member, comprising
a slider main body having a top surface, a bottom surface, an outwardly sloping sidewall surface extending from said to surface toward said bottom surface, and a notch extending from said to surface and said sloping sidewall surface through said slider main body to said bottom surface, said notch sized to receive the shaft of the locking pin;

wherein the to surface of the slider main body comprises a recessed region adapted to receive a bottom surface of said locking pin head, the method comprising the acts of:

inserting the shaft of the locking pin through a first aperture formed in a first part to be fastened;

inserting the second end of the cylindrical isolation sleeve over the pin shaft such that an axial surface of the isolation ring contacts a surface of the first part to form an integrated isolation sleeve;

attaching the retaining member to the distal end of said shaft to secure the isolation sleeve on the shaft;

inserting the integrated isolation sleeve through a second aperture in a second part to be fastened; and inserting the slider member between the locking pin head and a surface of the first part so as to displace the pin in an axial direction by an amount effective to deform said deformable sleeve wall such that a portion of the sleeve wall engages a surface of the second part to create a fastened condition.

9. The method according to claim 8, wherein the isolation ring is compressed between the two parts when the fastener assembly is in the fastened condition.

10. The method according to claim 8, wherein a bottom surface of the locking pin rests in a recessed region formed in a top surface of the slider member when the fastener assembly is in the fastened condition.

11. The method according to claim 8, wherein the step of inserting the integrated isolation sleeve through a second aperture precedes the step of attaching the retaining member to the distal end of the shaft.

* * * * *